Patented Dec. 29, 1942

2,306,626

UNITED STATES PATENT OFFICE 2,306,626

LUMINESCENT COMPOSITION

Magdalene Hüniger, Berlin-Charlottenburg, Joseph Rudolph, Berlin-Tegel, and Günther Aschermann, Berlin-Charlottenburg, Germany, assignors to General Electric Company, a corporation of New York No Drawing. Application May 24, 1940, Serial No. 337,090. In Germany May 25, 1939

11 Claims. (Cl. 250—81)

Our invention relates to luminescent compositions or phosphors.

The largest group of inorganic phosphors, those activated by foreign metals, is characterized by the fact that certain quantities of one or several foreign metals which act as activators are embedded in a colorless basic substance. For this basic substance the sulphides and silicates of the alkali and earth-alkali metals, including zinc and cadmium, have been mainly used, as well as the borates, carbonates, phosphates, sulphates, and halides of the same metals.

It has been found that phosphors of a surprisingly high emittive power can be obtained when only the acid component of the above salts is used as a basic substance instead of the salts themselves, that is to say, when the acids or acid-forming oxides themselves are used. The following acids or acid-forming oxides have proved to be suitable: boric acid, silicic acid, titanium dioxide, and phosphoric acid. These acids or acid-forming oxides can be considered from one common viewpoint. They constitute, considered as glass-forming agents, the group of the acids or acid-forming oxides which are preferred in the art. As activators, we may employ the metals or ions, which are known for the production of phosphors, for instance $Cu\cdot$, $Ag\cdot$, $Ce\cdots$, $Tl\cdot$, $Sn\cdot\cdot$, $Pb\cdot\cdot$, $Nb\cdots$ or $Cb\cdots$ (as it is better known), $Sb\cdots$, $Mn\cdot\cdot$. The quantities in which the activator is added may vary within wide limits, but they must be less than the quantity that is required for the formation of a stoichiometric compound.

In order to produce the new phosphors, the oxides or compounds which have been termed basic materials, or compounds which produce these oxides when heated, are mixed with the oxide of the activating metal, or with a compound having a volatile acid residue, for instance carbonate, chloride, sulphate. In some cases it is advantageous to produce first the metal salt (for instance metal phosphate) alone, and to add it to the acid basic substance (for instance phosphoric acid). When the mixture is subsequently fired or glowed, sintered or glassy products are obtained which can be reduced to the desired grain size by crushing with suitable mortars. In the case of an easily oxidizable metal, such as cerium, the firing takes place under reducing conditions.

The luminescent color of the phosphor is mainly determined by the activator metal. For instance manganese gives a red color, tin gives a white, and cerium gives a blue to ultra-violet emission. However, it is possible to influence the color of the emission in different ways. For instance, a displacement of the center of gravity or average wavelengths of the emission toward longer or shorter waves, respectively, or a widening of the emission bands, can be noted when the basic substance is not only one acid, but when the phosphoric acid, for instance, is partly replaced by silicic acid (or vice-versa) or the phosphoric acid or silicic acid, respectively, are partly replaced by other acid oxides. Another possibility of influencing the color of the emission lies in the common application of several activators. For instance, when tin (white) and manganese (red) are both present in the basic material, a yellow-orange emission is obtained. For some applications, for instance for the manufacture of electric lamps or projectors, it is desirable to obtain an emission which lies mainly in the ultra-violet spectral range. Certain activators, especially cerium and tantalum, have proved to be advantageous for the production of phosphors which are to have such short-wave emissions.

The following are examples of phosphors manufactured in accordance with the invention:

| Basic material | Activator | Color of emission | Intensity [1] |
|---|---|---|---|
| | Per cent by weight | | |
| $HPO_3$ | 8–10% $CeO_2$ | Ultra-violet | 1 |
| $B_2O_3$ | 20–30% $TiCl$ | Ultra-violet and blue | 1 |
| $SiO_2$ | 0.6–3% $SnO$ | Blue | 1 |
| $HPO_3$ | 10% $SnO$ | White | 1 |
| $TiO_2$ | 2.5–12% $Tl_2CO_3$ | Yellow | 2 |
| $B_2O_3$ | 10–20% $Sb_2O_3$ | Orange | 3 |

[1] 1=very good, 2=good, 3=medium strong.

The luminescent materials may, if desired, be coated on the interior of the tubular envelope of a low-pressure positive-column mercury discharge device which generates an abundance of radiations of 2537 A. wavelength. In such case, when an ultra-violet emitting material is employed, the said envelope should be made of a glass which is highly transmissive to the ultro-violet radiations (of about 3600 A. wavelength, for instance) emitted by the material.

What we claim as new and desire to secure by Letters Patent of the United States is:

1. A fluorescent material for use with a source of ultraviolet radiation consisting solely of a heat-treated combination of one or more acid glass-forming oxides and one or more metallic activators of luminescence in an amount which is less than that required to form a stoichiometric compound.

2. A fluorescent material for use with a source of ultraviolet radiation consisting solely of a heat-treated combination of one or more basic materials selected from the group consisting of boric acid, silicic acid, titanium dioxide and phosphoric acid, and one or more metallic activators of luminescence in an amount which is less than that required to form a stoichiometric compound.

3. A fluorescent material for use with a source of ultraviolet radiation consisting solely of a heat-treated combination of one or more acid glass-forming oxides and one or more metallic activators of luminescence selected from the group consisting of the ions Cu·, Ag·, Tl·, Sn··, Pb··, Mn··, Ce···, Cb··· and Sb··· in an amount which is less than that required to form a stoichiometric compound.

4. A fluorescent material for use with a source of ultraviolet radiation consisting solely of a heat-treated combination of one or more basic materials selected from the group consisting of boric acid, silicic acid, titanium dioxide and phosphoric acid, and one or more metallic activators of luminescence selected from the group consisting of the ions Cu·, Ag·, Tl·, Sn··, Pb··, Mn··, Ce···, Cb··· and Sb··· in an amount which is less than that required to form a stoichiometric compound.

5. A fluorescent material for use with a source of ultraviolet radiation consisting essentially of a heat-treated combination of a phosphoric basic material and one or more metallic activators of luminescence in an amount which is less than that required to form a stoichiometric compound.

6. A fluorescent material for use with a source of ultraviolet radiation consisting essentially of a heat-treated combination of a phosphoric basic material and a metallic activator of luminescence consisting of cerium in an amount which is less than that required to form a stoichiometric compound.

7. A fluorescent material for use with a source of ultraviolet radiation comprising a heat-treated combination of metal phosphate with a metallic activator of luminescence consisting of cerium in an amount which is less than that required to form a stoichiometric compound.

8. A fluorescent material for use with a source of ultraviolet radiation comprising a heat-treated combination of earth-alkali metal phosphate with a metallic activator of luminescence consisting of cerium in an amount which is less than that required to form a stoichiometric compound.

9. A fluorescent material for use with a source of ultraviolet radiation consisting essentially of a heat-treated combination of one or both of the acids selected from the group consisting of phosphoric acid and boric acid and one or more metallic activators of luminescence in an amount which is less than that required to form a stoichiometric compound.

10. A fluorescent material for use with a source of ultraviolet radiation consisting essentially of a heat-treated combination of phosphoric oxide and one or more metallic activators of luminescence in an amount which is less than that required to form a stoichiometric compound.

11. A fluorescent material for use with a source of ultraviolet radiation consisting essentially of heat-treated combination of phosphoric oxide and a metallic activator of luminescence consisting of tin in an amount which is less than that required to form a stoichiometric compound.

MAGDALENE HÜNIGER.
JOSEPH RUDOLPH.
GÜNTHER ASCHERMANN.